(12) United States Patent  
Lacombe

(10) Patent No.: US 9,266,402 B2  
(45) Date of Patent: Feb. 23, 2016

(54) TEMPORARY WHEEL SUPPORT FOR SNOWMOBILES

(71) Applicant: Daniel Lacombe, Ste-Victoire-de-Sorel (CA)

(72) Inventor: Daniel Lacombe, Ste-Victoire-de-Sorel (CA)

(*) Notice: Subject to any disclaimer, the term of this patent is extended or adjusted under 35 U.S.C. 154(b) by 0 days.

(21) Appl. No.: 14/552,404

(22) Filed: Nov. 24, 2014

(65) Prior Publication Data

US 2015/0210133 A1  Jul. 30, 2015

(51) Int. Cl.  
*B62B 13/18* (2006.01)  
*B62B 19/00* (2006.01)  
*B60F 5/00* (2006.01)  
*B62B 19/04* (2006.01)

(52) U.S. Cl.  
CPC . *B60F 5/00* (2013.01); *B62B 13/18* (2013.01); *B62B 19/00* (2013.01); *B62B 19/04* (2013.01)

(58) Field of Classification Search  
CPC ........ B62B 11/00; B62B 13/18; B62B 19/00; B62B 19/02; B62K 13/00; B62M 27/00; B60F 5/00  
USPC ........... 280/7.1, 7.12, 7.13, 8, 9, 10; 180/183; 301/120, 121, 122, 130  
See application file for complete search history.

(56) References Cited

U.S. PATENT DOCUMENTS

| | | | | |
|---|---|---|---|---|
| 487,990 | A | * | 12/1892 | Chittick .............................. 280/8 |
| 3,552,515 | A | * | 1/1971 | Tomita ........................... 180/184 |
| 3,709,512 | A | * | 1/1973 | Albertson ........................ 280/28 |
| 5,494,340 | A | * | 2/1996 | Cheng ...................... 301/111.07 |
| 5,645,291 | A | * | 7/1997 | Ramage ................... 280/87.042 |
| 2006/0090939 | A1 | * | 5/2006 | White ............................ 180/9.26 |
| 2010/0201087 | A1 | * | 8/2010 | Beaudoin .......................... 280/9 |

* cited by examiner

*Primary Examiner* — Frank Vanaman  
(74) *Attorney, Agent, or Firm* — Equinox IP

(57) ABSTRACT

A temporary wheel support for a snowmobile having at suspension and least one ski attached to the suspension via a bolt having a threaded portion. The temporary wheel support comprises a main body having a first and second opposed surfaces, the first surface having therein a threaded hole configured to be screwed onto the threaded portion of the bolt and a support member extending from the second surface, the support member having a top and a bottom recess support surfaces and an end wall. The support member is configured such that an associated wheel can be removably mounted thereon and held in place by the second opposed surface and the end wall, the wheel having ball bearings in contact with the top recess support surface in a non-weight-bearing configuration and in contact with the bottom recess support surface in a weight-bearing configuration.

13 Claims, 7 Drawing Sheets

TEMPORARY WHEEL SUPPORT FOR SNOWMOBILES

CROSS-REFERENCE TO RELATED APPLICATIONS

This application claims priority based on Canadian patent application No. 2,840,933 filed on Jan. 29, 2014, which is herein incorporated by reference.

TECHNICAL FIELD

The present disclosure relates to a temporary wheel support for snowmobiles. More specifically, the present disclosure relates to an apparatus for temporarily fixing a wheel to a ski of a snowmobile to allow it to travel over snowless surfaces.

BACKGROUND

Snowmobiles are designed to travel over snowy or icy surfaces and are thus equipped with a drive track for propulsion and two front skis for steering. The skis have smooth undersurfaces in order to glide over snowy or icy surfaces all the while providing control. However, the skis quickly wear when in contact with rough surfaces such as asphalt or cement, which surfaces are encountered on public roads, driveways, etc. Without any protection, the undersurfaces of the skis completely wear out in but a few thousand kilometers, which renders the snowmobile harder to control and thus less safe.

They are many inventions that allow snowmobiles to travel over snowless roads or other rough surfaces while protecting the undersurfaces of the skis from wear. However, these inventions are heavy, are not easily removable (they are left on the skis when not in use) and require tools to install or remove.

Accordingly, there is a need for a temporary wheel support for snowmobile that is light, allows for the easy installation and removal of the wheels without requiring any tools.

SUMMARY

The present disclosure provides a temporary wheel support for a snowmobile having at suspension and least one ski attached to the suspension via a bolt having a threaded portion, comprising:
 a main body having a first and second opposed surfaces, the first surface having therein a threaded hole configured to be screwed onto the threaded portion of the bolt;
 a support member extending from the second surface, the support member having a top and a bottom recess support surfaces and an end wall;
wherein the support member is configured such that an associated wheel can be removably mounted thereon and held in place by the second opposed surface and the end wall, the wheel having ball bearings in contact with the top recess support surface in a non-weight-bearing configuration and in contact with the bottom recess support surface in a weight-bearing configuration.

The present disclosure further provides a temporary wheel support as above, wherein the main body includes a clearance portion of a lower height adjacent the support member.

BRIEF DESCRIPTION OF THE FIGURES

Embodiments of the disclosure will be described by way of examples only with reference to the accompanying drawings, in which.

Similar references used in different Figures denote similar components.

DETAILED DESCRIPTION

Generally stated, the non-limitative illustrative embodiments of the present disclosure provides a temporary wheel support for snowmobiles that is simple to manufacture, install and use on top of being light weight, i.e. in the order of just a few ounces, which is not negligible. No tools, brackets or any locks are required to install or remove the wheel from the temporary wheel support. Unlike the case with previous solutions aiming to allow snowmobiles to travel over snowless roads or other rough surfaces, the wheels do not remain on the skis and are easily removed. Once removed, the wheels can be stored in a compartment on the snowmobile or any other place for this purpose.

Two main categories of snowmobiles cannot and do not use existing solutions for travelling over snowless roads or other rough surfaces without wearing its skis; sports snowmobiles and off-road snowmobiles.

Sports snowmobiles cannot afford to add weight on their skis. Existing solutions are such that the wheels are positioned on the skis at all time, including their support mechanisms, even when not in use, i.e. not in contact with the ground. This considerably increases the weight on the skis, which greatly reduces the effectiveness of the front suspension to absorb bumps and, therefore, renders the snowmobile less controllable and less stable.

With regard to off-road snowmobiles, which are usually used over terrain with deep snow, often having several feet of snow and no cleared paths or undergrowth, which may get caught in the wheels and support mechanisms of existing solutions.

These types of snowmobiles, particularly, require a solution that is very light, simple, without any complex mechanism and designed such that the weight of the wheels does not remain on the skis when not in use.

Other advantages of the temporary wheel support over existing solutions are:
- low cost of manufacturing, can be machined, soldered or molded;
- can be made of various materials such as aluminum, iron, steel, titanium or even some high resistance plastics;
- a single configuration for both left and right skis, which simplifies the manufacturing and inventory process;
- uses standard wheels readily available at snowmobile parts distributors, various models may be used;
- the temporary wheel support can be provided as a kit with a pair of wheels and corresponding temporary wheel supports, one kit per snowmobile.

Figure 1:
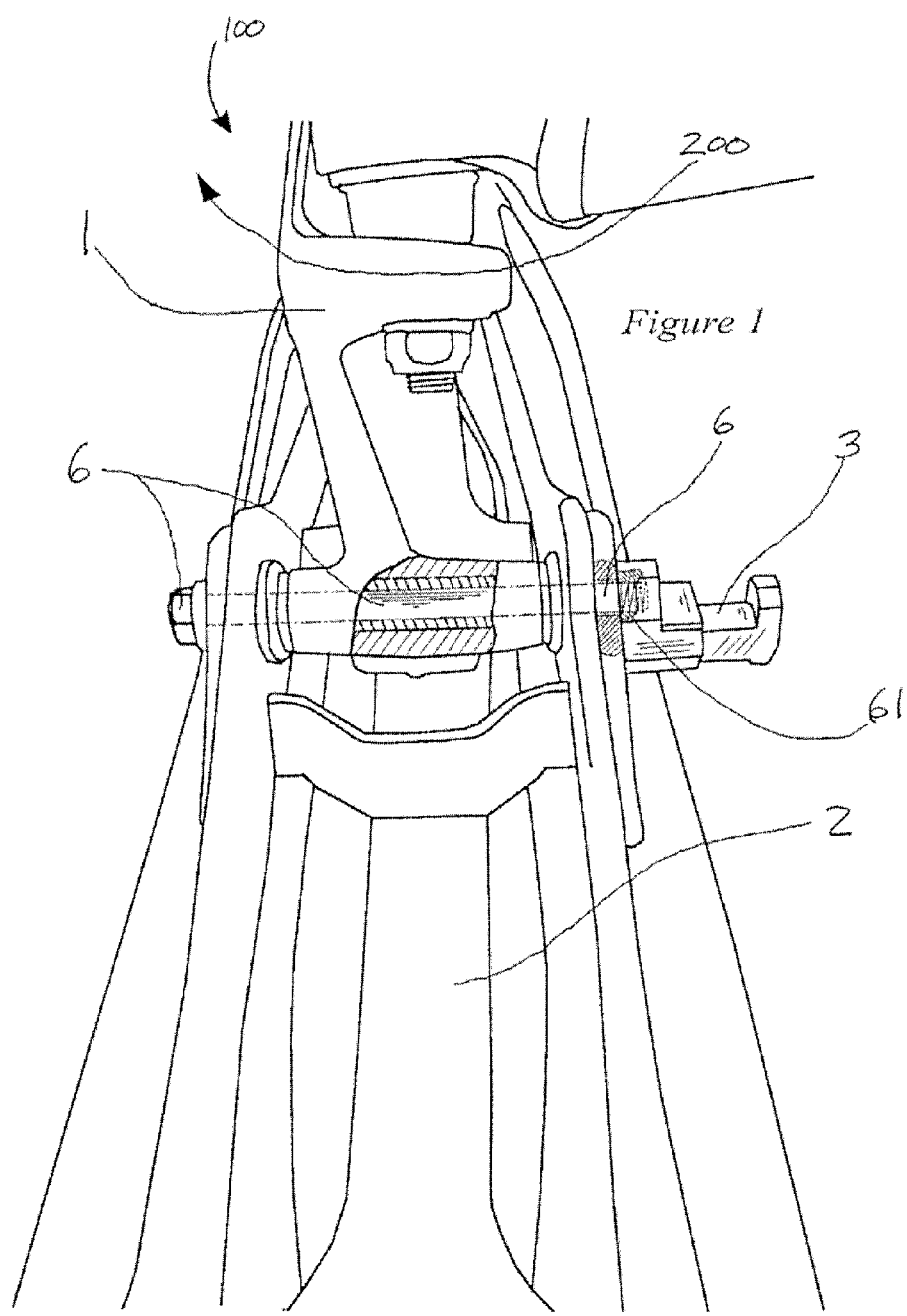
FIG. 1 is a front view of a snowmobile suspension arm and ski with a temporary wheel support in accordance with an illustrative embodiment of the present disclosure.
Figure 2:
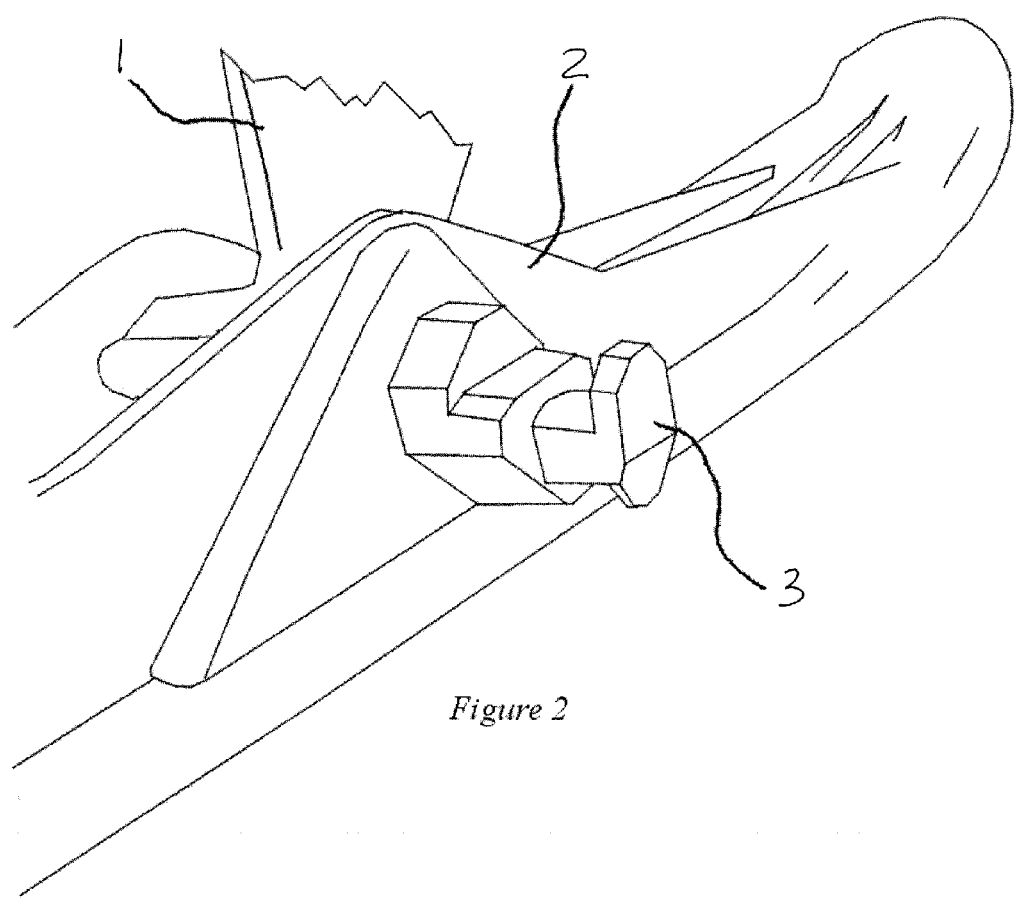
FIG. 2 is an isometric view of the snowmobile suspension arm and ski with the temporary wheel support.

Referring to FIGS. 1 and 2, there is shown part of a snowmobile suspension 100 including an arm 1, having pivot axis 200, to which is attached a ski 2 via bolt 6 having threaded portion 61 onto which is bolted a temporary wheel support 3 in accordance with an illustrative embodiment of the present disclosure.

Figure 3:
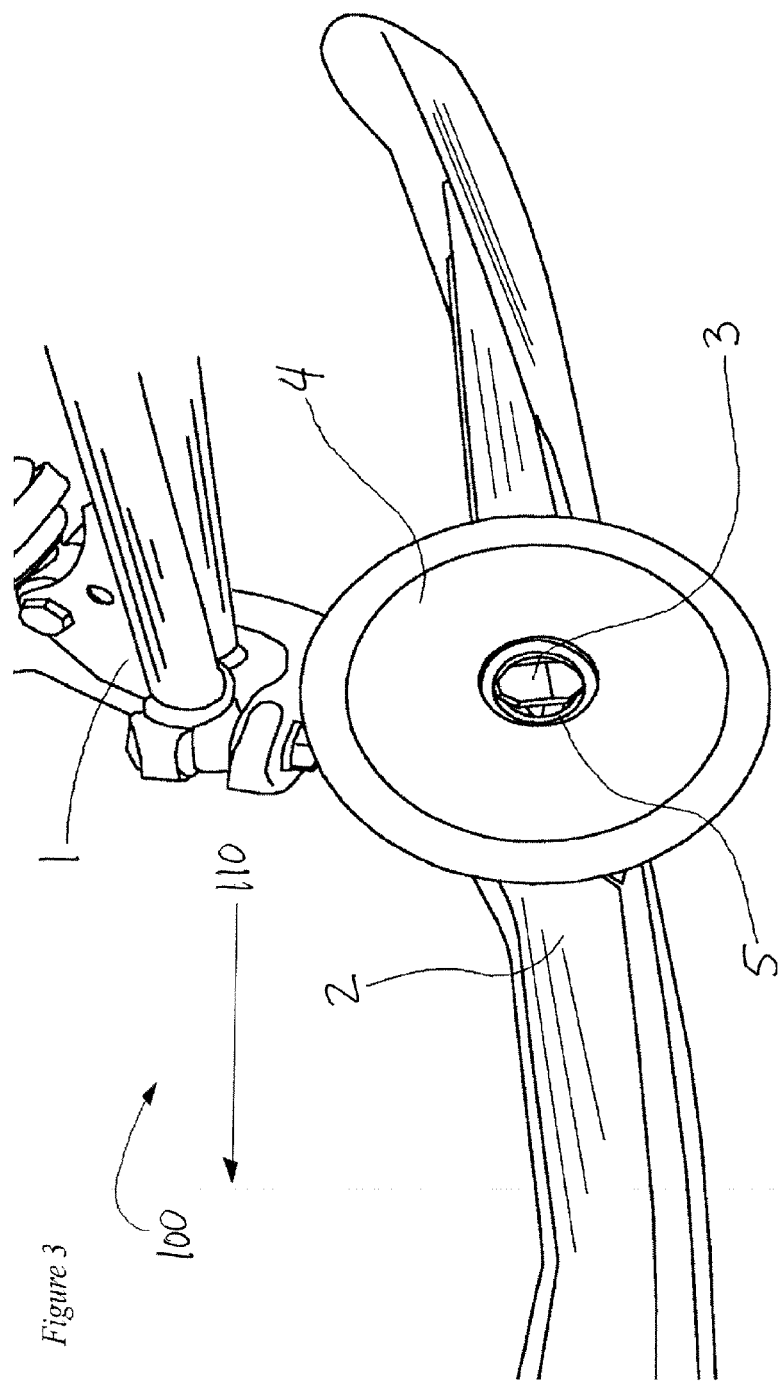
FIG. 3 is a side view of the suspension arm and ski showing a wheel positioned on the temporary wheel support.
Figure 4:
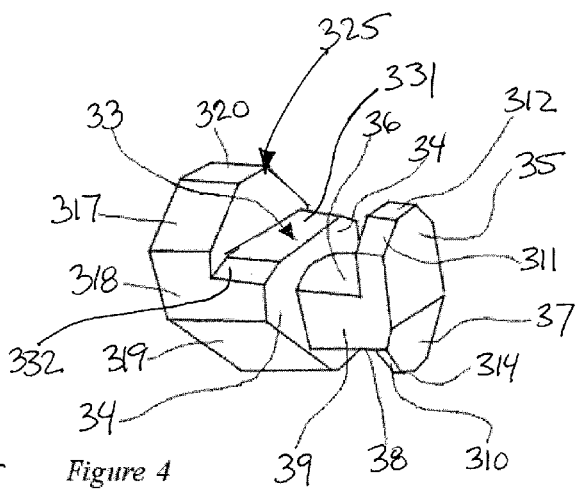
FIG. 4 is an isometric view of the temporary wheel support in accordance with an illustrative embodiment of the present disclosure.
Figure 5:
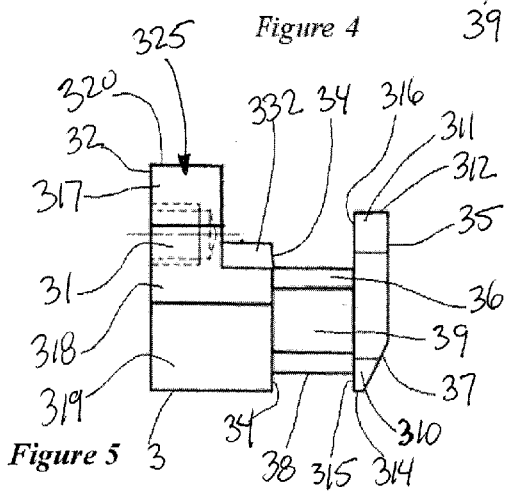
FIG. 5 is a side view of the temporary wheel support of FIG. 4.
Figure 6:
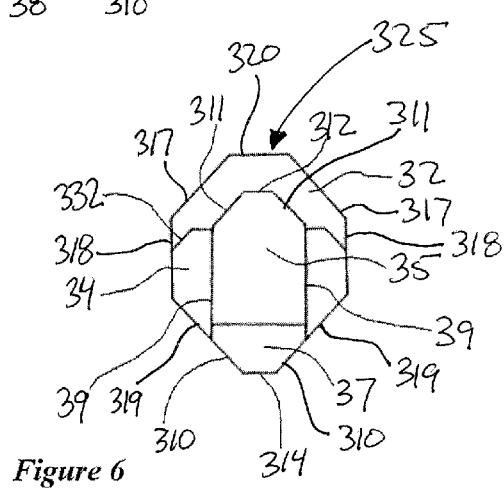
FIG. 6 is a front view of the temporary wheel support of FIG. 4.
Figure 7:
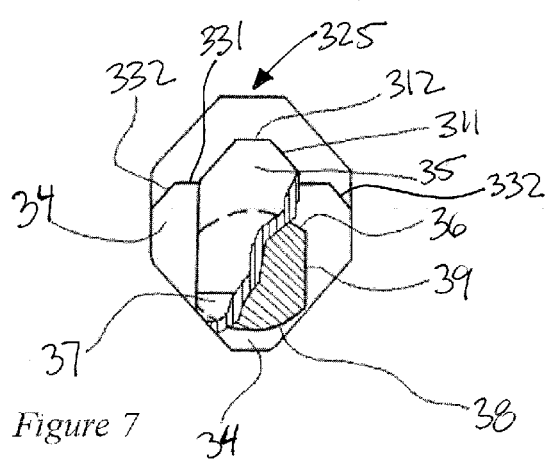
FIG. 7 is a front view of the temporary wheel support of FIG. 4 with a cross-section showing the upper and lower ball bearing support surfaces.
Figure 8:
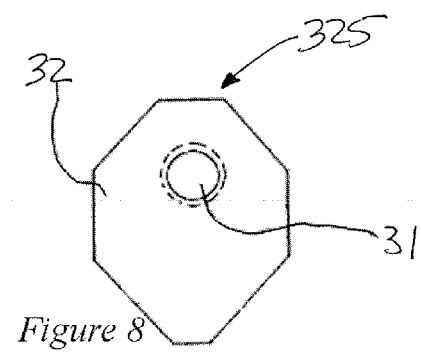
FIG. 8 is a rear view of the temporary wheel support of FIG. 4.

Referring now to FIG. 3, there is shown a wheel 4 mounted to the temporary wheel support 3 via ball bearings 5 for a snowmobile having a front end aligned with direction 110.

Referring to FIGS. 4 to 8, the temporary wheel support 3 comprises a bottom recess support surface 38 configured to provide support to the ball bearings 5 when the wheel 4 is in contact with the ground and supporting the weight of the snowmobile and a top recess support surface 36 for supporting the ball bearings 5 when the wheel 4 is not in contact with the ground and is not supporting the weight of the snowmobile.

Clearance portion 33 is composed of a horizontal recess surface 331 terminated at each end with an angled notch 332 in order to allow insertion of the wheel 4 onto the temporary wheel support 3. Angled surfaces 317, 318, 319 and 320 form a generally octagonal main body 325, whose configuration provides support for machining and cutting tools. This configuration also provides grip when screwing the temporary wheel support 3 onto bolt 6. It is to be understood that in alternative embodiments the contour shape of the main body 325 of the temporary wheel support 3 may vary, for example circular when using a molding process to produce the temporary wheel support 3.

In the illustrative embodiment the angled notches 332 form an angle of about 20° with regard to the horizontal recess surface 331. Basically, the geometry of the angled notches 332 and recess surface 331 is chosen such as to provide clearance to the wheel 4 during its insertion onto the temporary wheel support 3. Accordingly, the angles of the angled notches 332 may vary and in an alternative embodiment the angled notches 332 and recess surface 331 may form a curved surface.

The bottom 38 and top 36 recess support surfaces are formed into a support member 39 extending from a front end of the main body 325, the bottom 38 and top 36 recess support surfaces being partly enclosed by a support member end wall 35, forming a bottom 315 and a top 316 distal lateral support surfaces, and the front end of the main body 325 forming a proximal lateral support surface 34. The width of bottom 38 and top 36 recess support surfaces are advantageously set to be slightly narrower than the diameter of the center of the ball bearings 5. It is to be understood that the bottom 38 and top 36 recess support surfaces may be of various geometries.

In the illustrative embodiment, the proximal lateral support surface 34 extends upwardly from the top recess support surface 36 a distance of about 0.125 thousandth of an inch and the proximal lateral support surface 34 extends downwardly from the bottom recess support surface 38 a distance of about 0.345 thousandth of an inch, the total height of the support member end wall 35 being about 20% more than the diameter of the center of the ball bearings 5. In this example, the wheel 4 is a standard 9 inch 6205 LU wheel.

A threaded hole 31 is formed into a rear end 32 of the main body 325 for receiving the corresponding threaded portion 61 of bolt 6 for the mounting of the temporary wheel support 3 onto the bolt 6.

In the illustrative embodiment the threaded hole 31 is positioned at about ¾ of the height of the rear end 32 of the main body 325.

The support member end wall 35 is provided with angled notch 37, top 312 and bottom 314 surfaces as well as notches 310 and 311 in order to provide clearance for the mounting of the wheel 4 onto the temporary wheel support 3.

In the illustrative embodiment the angled notch 37 is at an angle of about 20° towards the bottom distal lateral support surface 315 while notches 310 and 311 form angles of about 45° with regard to the top 312 and bottom 314 surfaces, respectively, notches 311 being positioned at about ¾ of the height of the support member end wall 35.

It is to be understood that other geometries may be used for the support member end wall 35, for example a circular or oval shape.

Figure 9:
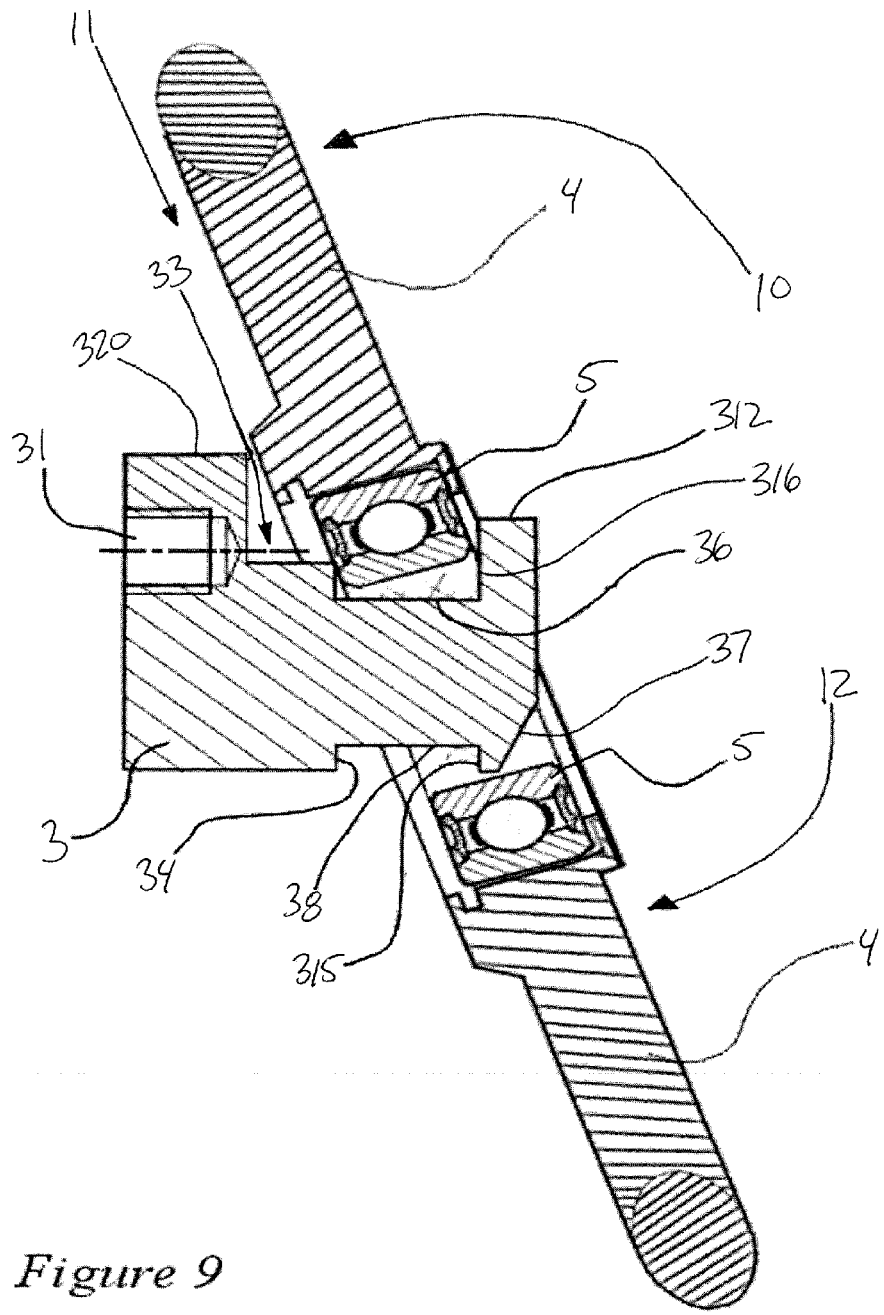
FIG. 9 is a cross-sectional view of the temporary wheel support of FIG. 4 illustrating the mounting of a wheel thereon.
Figure 10:
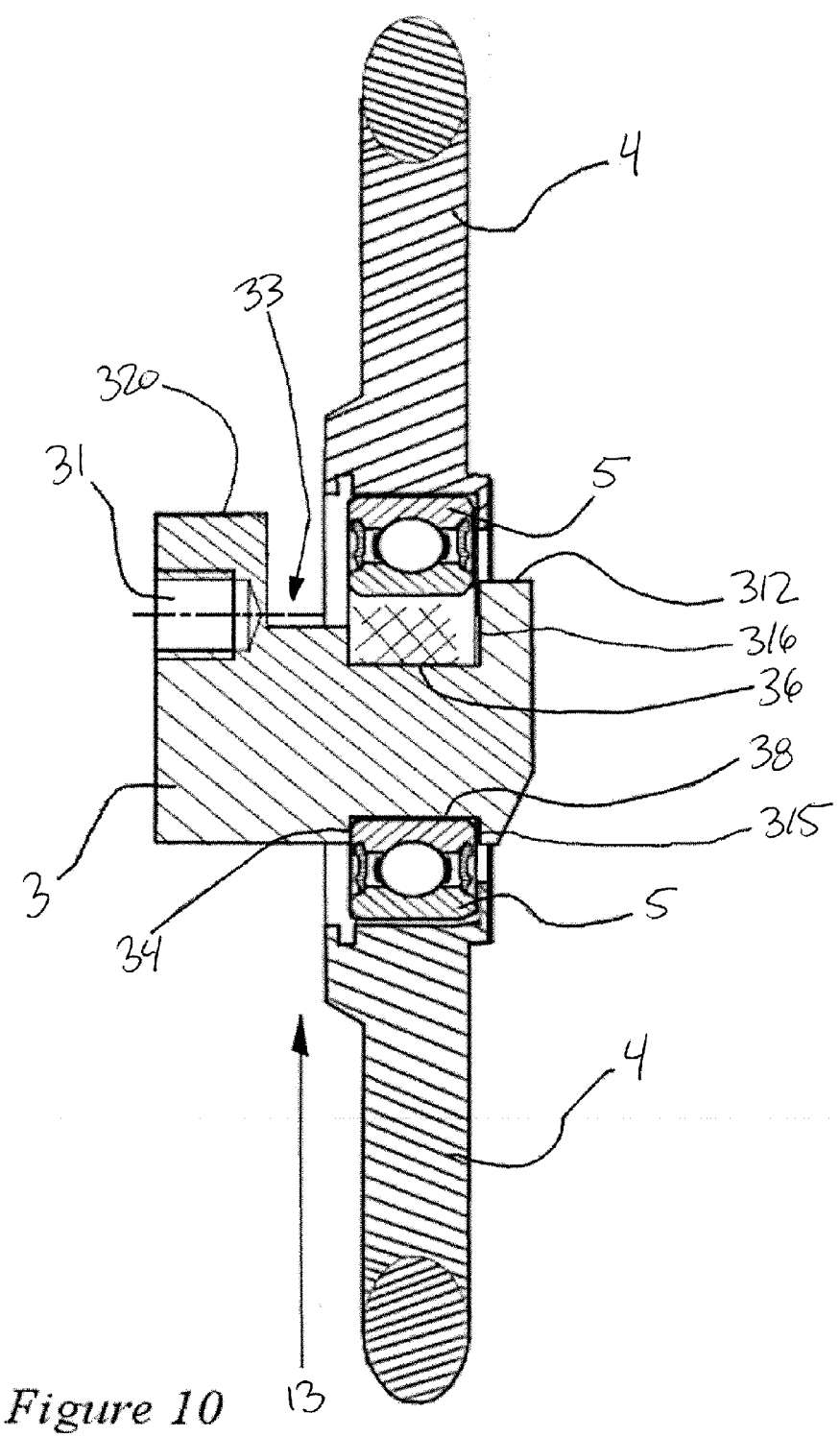
FIG. 10 is a cross-sectional view of the temporary wheel support of FIG. 4 onto which a wheel is mounted in a weight-bearing configuration.

Referring now to FIGS. 9 and 10, there is shown the wheel 4 being mounted onto the temporary wheel support 3 (FIG. 9) and mounted in a weight-bearing configuration (FIG. 10).

The top part of the wheel 4 is first pushed in direction 10 at an angle, for example at an angle of 40°, such that the ball bearings top part passes over surface 312, the clearance portion 33 allowing the proper insertion of the wheel 4 at an angle, and the wheel 4 is pushed down in direction 11 such that the top part of the ball bearings is brought to rest against the top recess support surface 36. Finally, the bottom part of the wheel 4 is pushed in direction 12, angled notch 37 allowing the bottom part of the ball bearings 5 to clear bottom surface 314.

In a weight-bearing configuration, the weight of the snowmobile pushes the wheel 4 in direction 13, the bottom part of the ball bearings 5 resting against the bottom 38 recess support surface with the proximal 34 and bottom distal 315 lateral support surfaces holding the wheel 4 in place onto the temporary wheel support 3. When in a non-weight-bearing configuration, the weight of the wheel 4 pushes it in the opposite direction of direction 13, the top part of the ball bearings 5 then resting against the top 36 recess support surface with the proximal 34 and top distal 316 lateral support surfaces holding the wheel 4 in place onto the temporary wheel support 3.

Figure 11:
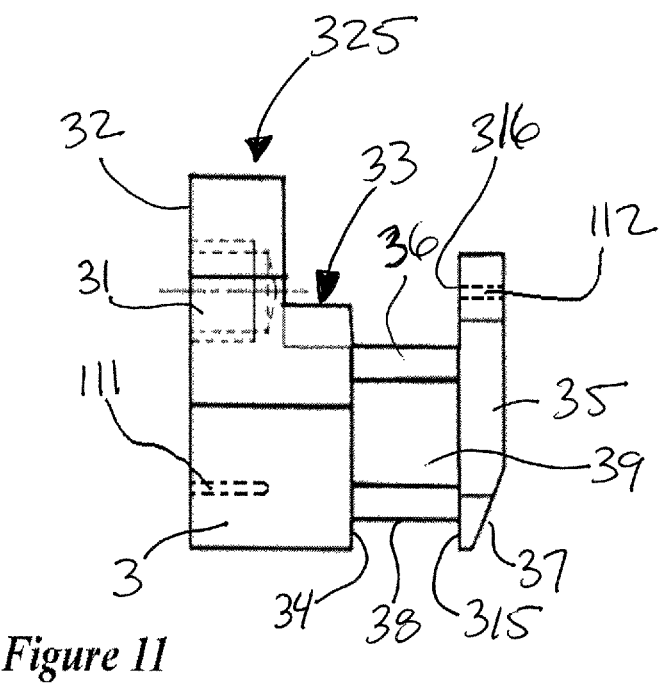
FIG. 11 is a side view of a temporary wheel support in accordance with an alternative embodiment of the present disclosure.

Referring to FIG. 11, there is shown an alternative embodiment of the temporary wheel support 3 further provided with ski securing pin hole 111 for inserting a pin through the ski 2 and into the temporary wheel support 3, to ensure proper alignment and ensure it stays locked into position (i.e. does not rotate) and/or a wheel securing pin hole 112 for inserting a pin through the temporary wheel support 3 and below the ball bearings 5, to ensure the wheel 4 stays locked onto the weight bearing configuration and stays onto the temporary wheel support 3.

In Use

The temporary wheel support 3 is installed on each of the skis 2 and whenever the snowmobiler sees that he needs to have wheels in order to travel over a snowless road or other rough surface, he/she takes the wheels 4 out of the snowmobile saddlebags or other support or storage device and then lifts each ski in turn (for example using the handle usually provided with each ski 2), and inserts a wheel 4 onto each of the temporary wheel supports 3 in a non-weight-bearing configuration as previously described (see FIG. 9). When the snowmobiler releases the ski 2, the weight of the snowmobile is applied unto the wheels 4, which puts them in the weight-bearing configuration (see FIG. 10).

When back onto a snowy surface, the snowmobiler lifts each ski in turn and removes the wheels 4 by simply reversing the order of the previously described steps. When the wheels 4 are removed from the temporary wheel supports 3 they are stored back into the saddlebags or other support or storage device and the skis 2 are back in contact with the ground.

Although the present disclosure has been described with a certain degree of particularity and by way of an illustrative embodiments and examples thereof, it is to be understood that the present disclosure is not limited to the features of the embodiments described and illustrated herein, but includes all variations and modifications within the scope and spirit of the present disclosure and as hereinafter claimed.

What is claimed is:

1. A temporary wheel support for a snowmobile having a suspension and at least one ski attached to said suspension via a bolt having a threaded portion, comprising:
   a main body having a first and second opposed surfaces, said first surface having therein a threaded hole configured to be screwed onto said threaded portion of said bolt;
   a support member extending from said second surface, said support member having a top and a bottom recess support surfaces and an end wall, said end wall including a top and a bottom part, said bottom part including a notch inclined towards said second surface;
   wherein said support member is configured such that an associated wheel can be removably mounted thereon and held in place by said second opposed surface and said end wait, said wheel having ball bearings in contact with said top recess support surface in a non-weight-bearing configuration and in contact with said bottom recess support surface in a weight-bearing configuration.

2. The temporary wheel support of claim 1, wherein said notch is inclined at an angle 20°.

3. The temporary wheel support of claim 1, wherein said threaded hole is located at ¾ of the height of said first surface.

4. The temporary wheel support of claim 1, wherein said end wall top part is composed of a horizontal surface terminated at each end by inclined surfaces.

5. The temporary wheel support of claim 4, wherein said top part inclined surfaces are at an angle of 45°.

6. The temporary wheel support of claim 1, wherein said end wall bottom part is composed of a horizontal surface terminated at each end by inclined surfaces.

7. The temporary wheel support of claim 6, wherein said bottom part inclined surfaces are at an angle of 45°.

8. The temporary wheel support of claim 1, wherein said main body is of a shape selected from the group consisting of an octagonal shape and a circular shape.

9. The temporary wheel support of claim 1, wherein said end wall has a height of 20% more than the diameter of a center opening of said ball bearings.

10. The temporary wheel support of claim 1, wherein said temporary wheel support is made of a material selected from the group consisting of aluminum, iron, steel, titanium and high resistance plastic.

11. The temporary wheel support of claim 1, wherein said temporary wheel support is made using a process selected from the group consisting of machining and molding.

12. A temporary wheel support for a snowmobile having a suspension and at one ski attached to said suspension via a bolt having a threaded portion, comprising:
   a main body having a first and second opposed surface, said first surface having therein a threaded hole configured to be screwed onto said threaded portion of said bolt, and a clearance portion composed of a horizontal surface terminated at each end by inclined surfaces, said clearance portion being of a lower height than said main body and adjacent a support member extending from said second surface, said support member having a top and a bottom recess support surfaces and an end wall;
   wherein said support member is configured such that an associated wheel can be removably mounted thereon and held in place by said second opposed surface and said end wall, said wheel having ball bearings in contact with said top recess support surface in a non-weight-bearing configuration and in contact with bottom recess support surface in a weight-bearing configuration.

13. The temporary wheel support of claim 12, wherein said clearance portion inclined surfaces are at an angle of 20°.

\* \* \* \* \*